United States Patent
Abhishek

(10) Patent No.: US 10,101,163 B2
(45) Date of Patent: *Oct. 16, 2018

(54) SYSTEMS AND METHODS FOR DRIVER AND VEHICLE TRACKING

(71) Applicant: CalAmp Corp., Irvine, CA (US)

(72) Inventor: Abhishek, Herndon, VA (US)

(73) Assignee: CALAMP CORP, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,131

(22) Filed: May 3, 2017

(65) Prior Publication Data

US 2017/0234688 A1    Aug. 17, 2017

Related U.S. Application Data

(63) Continuation of application No. 14/550,639, filed on Nov. 21, 2014, now Pat. No. 9,648,579.

(51) Int. Cl.
*G01C 21/34* (2006.01)
*H04W 4/04* (2009.01)
*G01S 19/13* (2010.01)

(52) U.S. Cl.
CPC ........ *G01C 21/3407* (2013.01); *H04W 4/046* (2013.01); *G01S 19/13* (2013.01)

(58) Field of Classification Search
CPC ..... G01C 21/3407; H04W 4/046; G01S 19/13
USPC .......................................... 701/519
See application file for complete search history.

(56) References Cited

U.S. PATENT DOCUMENTS

| | | | |
|---|---|---|---|
| 8,330,626 B1 | 12/2012 | Adelson | |
| 8,489,271 B2 | 7/2013 | Hergesheimer et al. | |
| 9,395,186 B2* | 7/2016 | Link, II | G01C 21/3446 |
| 9,648,579 B2 | 5/2017 | Abhishek | |
| 2005/0283286 A1 | 12/2005 | Kanda et al. | |
| 2009/0077229 A1 | 3/2009 | Ebbs | |
| 2011/0130906 A1 | 6/2011 | Mayer | |
| 2011/0238289 A1 | 9/2011 | Lehmann et al. | |
| 2012/0041618 A1 | 2/2012 | Sun et al. | |
| 2012/0116669 A1 | 5/2012 | Lee | |

(Continued)

FOREIGN PATENT DOCUMENTS

WO    2016081901    5/2016

OTHER PUBLICATIONS

International Preliminary Report on Patentability for International Application PCT/US2015/061990, Report issued May 23, 2017, dated Jun. 1, 2017, 5 Pgs.

(Continued)

*Primary Examiner* — Marthe Y Marc-Coleman

(57) ABSTRACT

Systems and method are provided for tracking locations of a driver and vehicle. In one example, a location tracking system pairs a vehicle location device and a driver location device by associating a driver identifier and a timestamp with the driver location device and the vehicle location device, obtains vehicle location data including a set of vehicle location data points, obtains driver location data including a set of driver location data points, correlates the vehicle location data and the driver location data, generates vehicle driver data based on the correlated vehicle location data and driver location data, and identifies a driver of the vehicle at a particular time by using the vehicle driver data and the timestamp.

20 Claims, 6 Drawing Sheets

(56) References Cited

U.S. PATENT DOCUMENTS

| | | |
|---|---|---|
| 2013/0030811 A1 | 1/2013 | Olleon et al. |
| 2013/0073142 A1 | 3/2013 | Hergesheimer et al. |
| 2013/0244210 A1* | 9/2013 | Nath .................. G07C 5/008 434/65 |
| 2013/0249713 A1 | 9/2013 | Adelson |
| 2013/0302756 A1 | 11/2013 | Takeuchi |
| 2013/0338855 A1 | 12/2013 | Mason |
| 2014/0111354 A1 | 4/2014 | Hergesheimer et al. |
| 2014/0142886 A1 | 5/2014 | Hergesheimer et al. |
| 2014/0236518 A1 | 8/2014 | Hergesheimer et al. |
| 2014/0236519 A1 | 8/2014 | Hergesheimer et al. |
| 2014/0303836 A1 | 10/2014 | Phelan et al. |
| 2015/0026047 A1* | 1/2015 | Johnson, Jr. .......... G06Q 50/30 705/39 |
| 2015/0187019 A1* | 7/2015 | Fernandes ............. G06Q 40/08 705/4 |
| 2016/0146615 A1 | 5/2016 | Abhishek |

OTHER PUBLICATIONS

International Search Report and Written Opinion for International Application No. PCT/US2015/061990, completed Jan 12, 2016, dated Feb 4, 2016, 6 Pgs.

\* cited by examiner

SYSTEMS AND METHODS FOR DRIVER AND VEHICLE TRACKING

CROSS-REFERENCE TO RELATED APPLICATIONS

The instant application claims priority to U.S. patent application Ser. No. 14/550,639, filed Nov. 21, 2014 and issued as U.S. Pat. No. 9,648,579 on May 9, 2017, the disclosure of which is hereby incorporated by reference in its entirety.

FIELD OF THE INVENTION

The present invention relates to location tracking and more specifically to tracking the location of vehicle and drivers.

BACKGROUND

A Global Positioning System (GPS) is a space-based global navigation satellite system that utilizes a network of geo-synchronous satellites that can be utilized by a GPS receiver to determine its location. Many telematics systems incorporate a Global Positioning System (GPS) receiver that can be used to obtain the location of a vehicle at a certain measured time. Using the signals received by the GPS receiver, the heading information of the vehicle can be determined. A GPS receiver can determine velocity information in a variety of ways including, but not limited to, measuring the Doppler shift of the received signals and by comparing the location of a vehicle at a plurality of measured times. The acceleration of the vehicle can be determined as the change in speed divided by the time between the measurements. A GPS receiver's ability to determine acceleration can be limited due to the dependence of the measurement upon factors such as, but not limited to, reception and satellite availability. In addition to location information, a GPS receiver can also be configured to provide time data. However, measurements determined via a GPS receiver can contain errors that affect the accuracy of the measured information. In particular, GPS signals are vulnerable to signal delays, inconsistencies of atmospheric conditions that affect the speed of the GPS signals as they pass through the Earth's atmosphere, and multipath distortions. Additionally, other factors not listed above can influence GPS signals and result in measurement errors.

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording data related to the operation of the vehicle and providing that information for analysis, whether in real-time or during a time when the vehicle is being serviced. This information can be used in a variety of applications, such as fleet tracking, shipment tracking, insurance calculations, and in vehicle management and service.

SUMMARY OF THE INVENTION

Systems and methods for driver and vehicle tracking in accordance with embodiments of the invention are disclosed. In one embodiment of the invention, a location tracking system includes a processor and a memory storing a location tracking application, wherein the location tracking application directs the processor to obtain vehicle location data, where the vehicle location data includes a set of vehicle location data points, obtain driver location data, where the driver location data includes a set of driver location data points, correlate the vehicle location data and the driver location data, and generate vehicle driver data based on the correlated vehicle location data and driver location data, where the generated vehicle driver data includes a set of drivers associated with a vehicle.

In an additional embodiment of the invention, the location tracking application directs the processor to obtain vehicle location data from a vehicle location device.

In another embodiment of the invention, the location tracking system further includes a network interface and the location tracking application directs the processor to obtain the vehicle location data using the network interface.

In yet another additional embodiment of the invention, the location tracking application directs the processor to obtain driver location data from a driver location device.

In still another additional embodiment of the invention, the location tracking application directs the processor to correlate the vehicle location data and the driver location data based on overlapping location data points in the set of vehicle location data points and driver location data points.

In yet still another additional embodiment of the invention, the vehicle location data further includes a vehicle location sampling rate, the driver location data further includes a driver location sampling rate, and the correlation of the overlapping location data points is based on the vehicle location sampling rate and the driver location sampling rate.

In yet another embodiment of the invention, the driver location sampling rate is greater than the vehicle location sampling rate.

In still another embodiment of the invention, the driver location sampling rate is greater than or equal to double the vehicle location sampling rate.

In yet still another embodiment of the invention, the driver location data further includes driver identification data uniquely identifying the driver and the vehicle driver data further includes the driver identification data.

In yet another additional embodiment of the invention, the location tracking application directs the processor to correlate the vehicle location and the driver location data by calculating vehicle route data based on the vehicle location data, where the vehicle route data includes a path describing the route taken by the vehicle, calculating driver route data based on the driver location data, where the driver route data includes a path describing the route taken by the driver, computing a similarity score based on the vehicle route data and the driver route data, and when the similarity score exceeds a threshold value, determine that the vehicle location data and the driver location data are correlated.

Still another embodiment of the invention includes a method for associating drivers with vehicles, including obtaining vehicle location data using a location tracking system, where the vehicle location data includes a set of vehicle location data points, obtaining driver location data using the location tracking system, where the driver location data includes a set of driver location data points, correlating the vehicle location data and the driver location data using the location tracking system, and generating vehicle driver data based on the correlated vehicle location data and driver location data using the location tracking system, where the generated vehicle driver data includes a set of drivers associated with a vehicle.

In yet another additional embodiment of the invention, the vehicle location data is obtained from a vehicle location device.

In still another additional embodiment of the invention, the location tracking system includes a network interface and the method includes obtaining the vehicle location data using the network interface.

In yet still another additional embodiment of the invention, the driver location data is obtained from a driver location device.

In yet another embodiment of the invention, the method further includes correlating the vehicle location data and the driver location data based on overlapping location data points in the set of vehicle location data points and driver location data points using the location tracking system.

In still another embodiment of the invention, the vehicle location data further includes a vehicle location sampling rate, the driver location data further includes a driver location sampling rate, and correlating the overlapping location data points is based on the vehicle location sampling rate and the driver location sampling rate.

In yet still another embodiment of the invention, the driver location sampling rate is greater than the vehicle location sampling rate.

In yet another additional embodiment of the invention, the driver location sampling rate is greater than or equal to double the vehicle location sampling rate.

In still another additional embodiment of the invention, the driver location data further includes driver identification data uniquely identifying the driver and the vehicle driver data further includes the driver identification data.

In yet still another additional embodiment of the invention, the method further includes correlating the vehicle location and the driver location data by calculating vehicle route data based on the vehicle location data using the location tracking system, where the vehicle route data includes a path describing the route taken by the vehicle, calculating driver route data based on the driver location data using the location tracking system, where the driver route data includes a path describing the route taken by the driver, computing a similarity score based on the vehicle route data and the driver route data using the location tracking system, and when the similarity score exceeds a threshold value, determining that the vehicle location data and the driver location data are correlated using the location tracking system.

DETAILED DESCRIPTION

Turning now to the drawings, systems and methods for driver and vehicle tracking in accordance with embodiments of the invention are disclosed. Automatic vehicle location (AVL) devices (i.e. telematics units) are commonly employed in the management of fleets of vehicles. Many companies employ AVL devices and software tracking products that automatically track their fleet of vehicles. Additionally, companies often employ a number of drivers and these drivers can be assigned to any of a variety of vehicles on any given day. Furthermore, multiple drivers can be assigned to the same vehicle on the same day, either in succession or at the same time. For example, two drivers can be assigned to a particularly long route so that one driver can sleep while the other drives the vehicle, thereby reducing the downtime of the vehicle.

Vehicle tracking systems in accordance with embodiments of the invention identify which drivers have been paired to which vehicles. Vehicle tracking systems obtain location information regarding the vehicles and drivers. The vehicle tracking systems can then correlate the driver location information with the vehicle location information in order to identify the drivers associated with a particular vehicle. In this way, vehicle tracking systems can automatically associate drivers and vehicles without having a pre-defined assignment of drivers to vehicles. This helps reduce scheduling issues with respect to drivers and vehicles along with providing accurate tracking of drivers and vehicles. Vehicle tracking system can also track the performance of individual drivers and vehicles. The tracked performance can include miles driven, routes taken, vehicles driven, stops made, total driving time, total rest time, vehicle condition, service intervals, and any other data as appropriate to the requirements of specific applications of the invention. In this way, vehicle tracking systems allow drivers to be automatically paired up with a vehicle when they head out to work. This reduces the overhead on companies that rotate their drivers across their vehicle fleet, etc . . . while accurately tracking the performance of the drivers and/or vehicles.

Systems and methods for driver and vehicle tracking in accordance with embodiments of the invention are discussed below.

Location Tracking Systems

Figure 1:
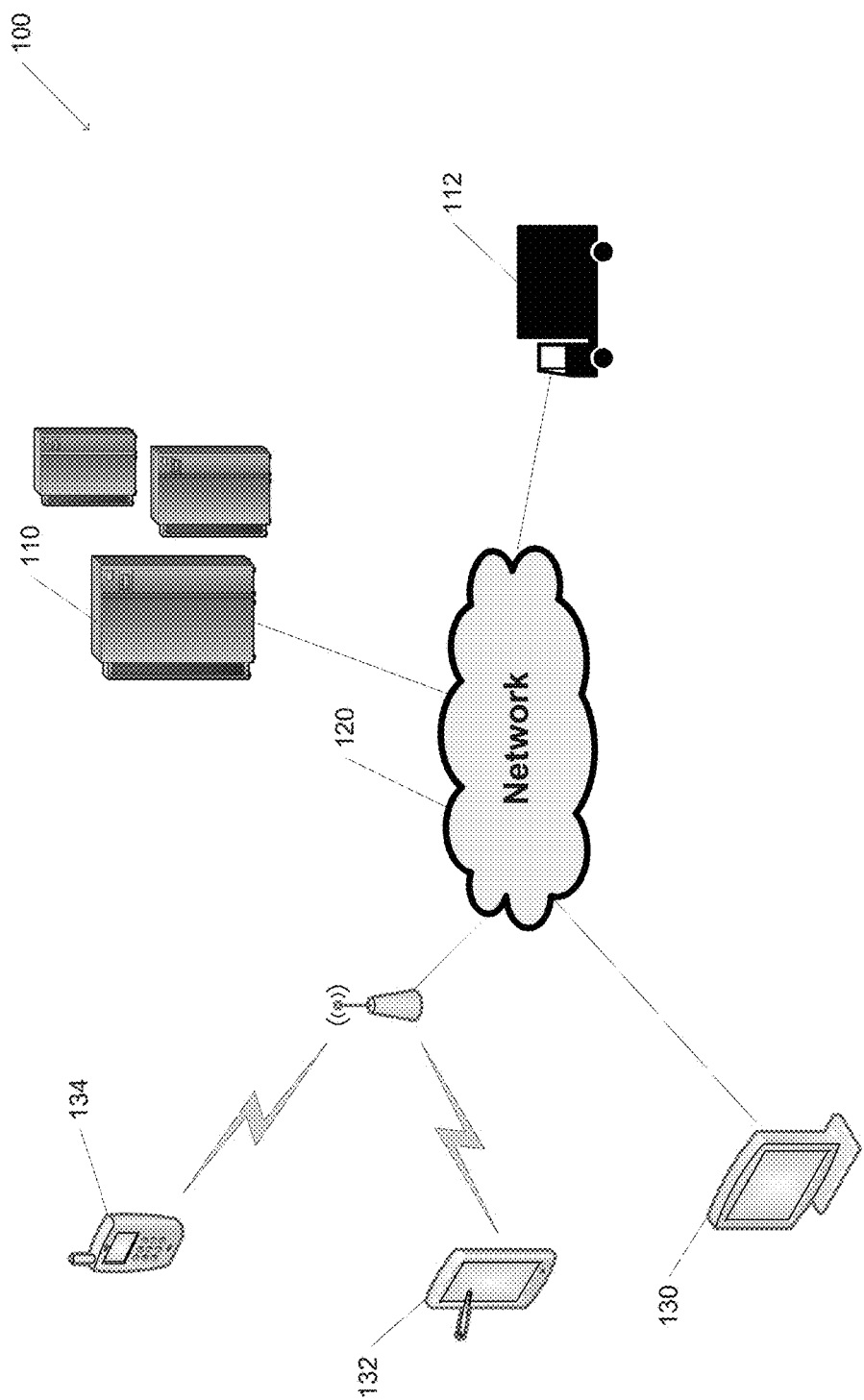
FIG. 1 is a conceptual illustration of a location tracking system in accordance with an embodiment of the invention.

Location tracking systems can obtain location data describing the location of vehicles and drivers and identify the driver(s) associated with a particular vehicle. A conceptual diagram of a location tracking system in accordance with an embodiment of the invention is shown in FIG. 1. The location tracking system 100 includes a location tracking server system 110, one or more vehicles 112, and driver location devices including, but not limited to, mobile devices 134, tablet devices 132, and personal computers 130, communicating via a network 120. In a variety of embodiments, the network 120 is the Internet. In many embodiments, the network 120 is a wired or wireless connection between the vehicle tracking device in the vehicle, the driver location device(s), and/or the location tracking server system 110. In a number of embodiments, the location tracking server system 110 implemented using a single server system. In several embodiments, the location tracking server system 110 is implemented using multiple server systems.

A vehicle 112 includes at least one vehicle tracking device, such as an automatic vehicle location system, that identifies the location of the location tracking device. In many embodiments, the vehicle tracking device utilizes the Global Positioning System (GPS) in order to determine the location of the vehicle. However, it should be noted that any location-determining techniques, such as cellular tower triangulation, wireless network geolocation techniques, and dead reckoning techniques, can be utilized as appropriate to the requirements of specific applications of embodiments of the invention. In many embodiments, the vehicle tracking device includes a network device that communicates via at least one network connection. This network connection can be a cellular (or any other wireless) data connection and/or a wired connection as appropriate to the requirements of specific applications of the invention. The vehicle tracking device utilize the network device to transmit location data and/or any other metadata regarding the vehicle 112 as described in more detail below.

The driver location devices track the location of the driver. In many embodiments, the driver location devices utilize techniques similar to those described with respect to the vehicle tracking devices in order to determine the location of the driver along with any of a variety of metadata describing the driver, the driver's location, and/or performance information related to the driver. In a number of embodiments, driver location devices include a network device that communicates via one or more networks. In several embodiments, driver location devices connect to vehicle tracking devices and utilize a network connection provided by the vehicle tracking device to transmit driver location data. Similarly, vehicle tracking devices can connect to driver location devices to transmit vehicle location data. This connection can be any data connection, including wired and wireless connections, as appropriate to the requirements of specific applications of embodiments of the invention. Additionally, driver location devices and/or vehicle location devices can cache driver location data and/or vehicle location data and transmit data once a network connection becomes available.

The location tracking system 110 obtains vehicle location data and driver location data describing the location (and other metadata) of the vehicles and drivers. The location tracking system 110 generates vehicle driver data describing the associations of drivers and vehicles along with any of a variety of performance data utilizing any of a variety of location tracking processes, such as but not limited to those described herein. In a variety of embodiments, the location tracking system 110 provides a user interface allowing for visualizing and interacting with the data. In several embodiments, the location tracking system provides an interface, such as an application programming interface (API) or web service, that provides some or all of the data to third-party systems for further processing. Access to the interface can be open and/or secured using any of a variety of techniques, such as by using client authorization keys, as appropriate to the requirements of specific applications of the invention.

Although a specific architecture of a location tracking system in accordance with embodiments of the invention are discussed above and illustrated in FIG. 1, a variety of architectures, including location devices and techniques not specifically named, can be utilized in accordance with embodiments of the invention.

Location Tracking Server Systems

Figure 2:
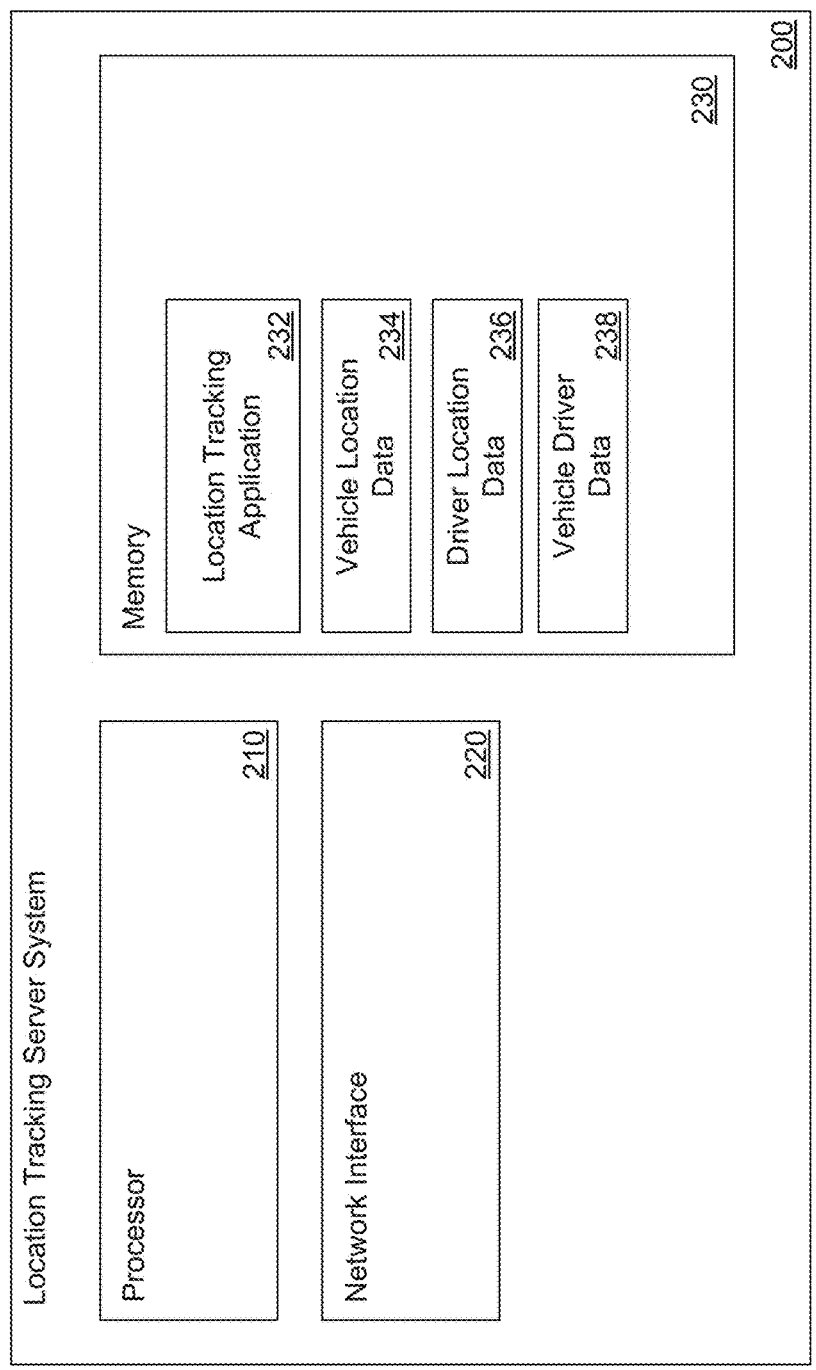
FIG. 2 is a conceptual illustration of a location tracking server system in accordance with an embodiment of the invention.

Location tracking server systems in accordance with embodiments of the invention obtain location information for vehicles and drivers and determines associations between the vehicles and the drivers who are driving the vehicles. Additionally, location tracking server systems can measure performance information with respect to the vehicles and/or the drivers. A conceptual illustration of a location tracking server system in accordance with an embodiment of the invention is shown in FIG. 2. The location tracking server system 200 includes a processor 210 in communication with memory 230. The location tracking server system 200 also includes a network interface 220 configured to send and receive data over a network connection. In a number of embodiments, the network interface 220 is in communication with the processor 210 and/or the memory 230. In several embodiments, the memory 230 is any form of storage configured to store a variety of data, including, but not limited to, a location tracking application 232, vehicle location data 234, driver location data 236, and vehicle driver data 238. In many embodiments, the location tracking application 232, vehicle location data 234, driver location data 236, and/or vehicle driver data 238 are stored using an external server system and received by the location tracking server system 200 using the network interface 220.

The processor 210 is configured by the location tracking application 232 to perform a variety of location tracking processes. Location tracking processes include obtaining vehicle location data and driver location data and generating vehicle driver data. A number of location tracking processes that can be performed in accordance with embodiments of the invention are described in more detail below.

Vehicle location data 234 includes a set of geographic location data, time data, sampling rate data, vehicle identification data, and/or any other data related to the vehicle and/or the location of the vehicle as appropriate to the requirements of specific applications of the invention. Driver location data 236 includes, but is not limited to, a set of geographic location data, time data, sampling rate data, driver identification data, and/or any other data related to the driver and/or the location of the driver as appropriate to the requirements of specific applications of the invention. Vehicle driver data 238 includes, but is not limited to, vehicle driver data describing a set of drivers associated with a vehicle, time data, location data, and/or any other data related to the association of drivers and vehicles as appropriate to the requirements of specific applications of embodiments of the invention.

Although a specific architecture for a location tracking server system in accordance with an embodiment of the invention is conceptually illustrated in FIG. 2, any of a variety of architectures, including those that store data or applications on disk or some other form of storage and are loaded into memory at runtime, can also be utilized. In a variety of embodiments, the memory 220 includes circuitry such as, but not limited to, memory cells constructed using transistors, that are configured to store instructions. Similarly, the processor 210 can include logic gates formed from transistors (or any other device) that are configured to dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Tracking Vehicles and Drivers

Location tracking processes can include obtaining vehicle location data and driver location data. As described above, vehicle location data and/or driver location data can be obtained from vehicle location devices and/or driver location devices. In several embodiments, driver location devices have a sampling rate describing how often the driver location device determines (and/or records) the location of the driver. Similarly, the vehicle location device can have its own sampling rate describing how often the vehicle location device determines (and/or records) the location of the vehicle. Additionally, the driver location data and/or vehicle location data can include time data for one or more of the recorded locations indicating the time at which the location was recorded. In a number of embodiments, the driver location data and/or the vehicle location data includes time data describing the start (and/or end) of location recording. Furthermore, the vehicle location data can include vehicle identification data describing the vehicle. Similarly, the driver location data can include driver identification data describing the driver.

In many embodiments, generating vehicle driver data includes correlating the location of a vehicle to the location of one or more drivers. In a number of embodiments, this correlation includes determining overlapping location data points between the location of the vehicle and the location of the driver. In several embodiments, the sampling rate of the driver location data is set to be twice that of the sampling rate of the vehicle location data. This sampling rate can be set on the device level and/or location data from the vehicle location data and the driver location data can be subsampled at the appropriate rate. However, it should be noted that any ratio of sampling rate, including those where the sampling rates are equal and those where the vehicle sampling rate exceeds the driver sampling rate, can be utilized as appropriate to the requirements of specific applications of the invention. Additionally, a variety of additional data, including the location data points, the proximity of the driver location data points and the vehicle location data points, speed and/or acceleration data associated with the location data points, and any other data can be utilized to correlate the various location data points as appropriate to the requirements of specific applications of the invention.

Many conditions can be measured to determine if a driver is correlated with a vehicle in accordance with embodiments of the invention, including if a threshold number of points are overlapping and if the route taken by the vehicle is similar to the route taken by the driver. In a number of embodiments, the similarity of a vehicle route and a driver route is determined by measuring similarity of the paths to calculate a similarity score describing the common features of the respective routes. The similarity score can then be compared to other similarity scores and/or threshold values in order to determine if the routes are sufficiently correlated to identify the driver of a vehicle. Vehicle driver data can be generated based on the correlation of vehicle location data points and driver location data points. As described above, the vehicle driver data describes the driver(s) associated with a particular vehicle based on the correlated location data and the identification information describing the vehicles and drivers. Additionally, any additional data, such as time data and/or speed data, can be utilized to describe the performance of the driver and/or vehicle as appropriate to the requirements of specific applications of embodiments of the invention.

Figure 3:
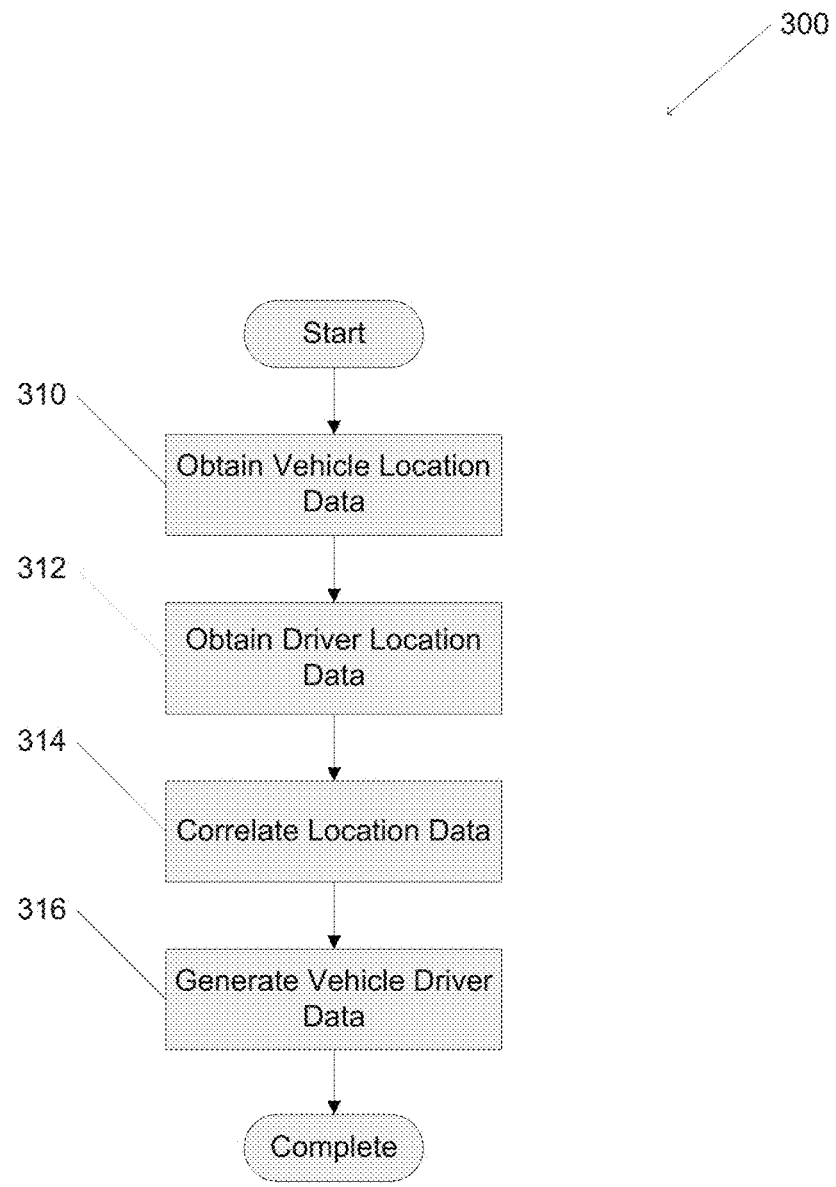
FIG. 3 is a flow chart illustrating a process for tracking vehicles and drivers in accordance with an embodiment of the invention.

A process for tracking vehicles and drivers in accordance with an embodiment of the invention is illustrated in FIG. 3. The process 300 includes obtaining (310) vehicle location data, obtaining (312) driver location data, correlating (314) location data, and generating (316) vehicle driver data.

Although specific processes for tracking vehicles and drivers in accordance with embodiments of the invention are described above with respect to FIG. 3, any number of processes can be utilized as appropriate to the requirements of a specific application in accordance with embodiments of the invention. Techniques for generating vehicle location data and driver location data in accordance with embodiments of the invention are described in more detail below.

Generating Vehicle Location Data

Vehicle location devices can determine the location of a vehicle over a particular time frame. Many vehicle location devices in accordance with embodiments of the invention utilize a variety of techniques to determine when a vehicle is moving or otherwise in order to better determine the location of the vehicle. In a number of embodiments, vehicle location devices determine when a vehicle has started before determining the location of the vehicle. Systems and methods for virtual ignition detection that can be utilized in accordance with embodiments of the invention are described in U.S. Pat. No. 8,489,271, issued Jul. 16, 2013. In several embodiments, vehicle location devices can utilize the acceleration of the vehicle as part of the location determination process. Systems and methods for calibrating and determining the acceleration of a vehicle that can be utilized in accordance with embodiments of the invention are disclosed in U.S. Patent Publication No. 2013/0073142, published Mar. 21, 2013, U.S. Patent Publication No. 2014/0236518, published Aug. 21, 2014, and U.S. Patent Publication No. 2014/0236519, published Aug. 21, 2014. In a variety of embodiments, acceleration events can be characterized to describe the performance of the driver and/or vehicle. Systems and methods for characterizing acceleration events that can be utilized in accordance with embodiments of the invention are described in U.S. Patent Publication No. 2014/0142886, published May 22, 2014. In many embodiments, particular driving events can be detected along with the location at which those events occurred. Systems and methods for detecting events and location reporting that can be utilized in accordance with embodiments of the invention are described in U.S. Patent Publication No. 2014/0111354, published Apr. 24, 2014. The disclosures of U.S. Pat. No. 8,489,271 and U.S. Patent Publication Nos. 2013/0073142, 2014/0111354, 2014/0142886, 2014/0236518, and 2014/0236519 are hereby incorporated by reference in their entirety. Some or all of the driving events, measured data, identification information, and/or any other metadata can be included in vehicle location data as appropriate to the requirements of specific applications of embodiments of the invention.

Figure 4:
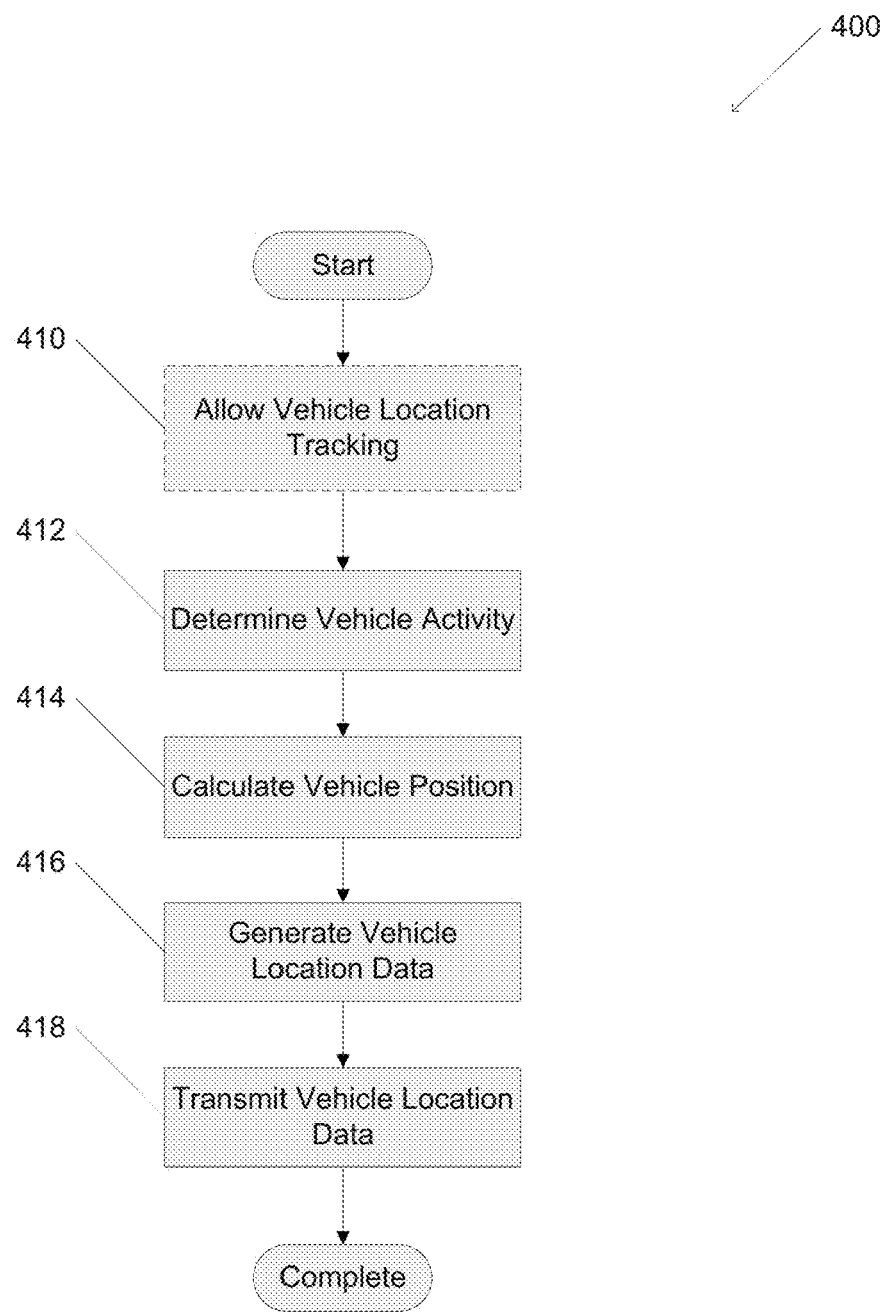
FIG. 4 is a flow chart illustrating a process for generating vehicle location data in accordance with an embodiment of the invention.

A process for generating vehicle location data in accordance with an embodiment of the invention is illustrated in FIG. 4. In many embodiments, the process 400 includes allowing (410) vehicle location tracking. The process 400 also includes determining (412) vehicle activity, calculating (414) vehicle position data, generating (416) vehicle location data, and transmitting (418) vehicle location data.

Although specific processes for generating vehicle location data in accordance with embodiments of the invention are described above with respect to FIG. 4, any number of processes, including those that store vehicle location data on a vehicle location device and transmit the data once the location determining device is connected to a network or a location tracking server system, can be utilized as appropriate to the requirements of a specific application in accordance with embodiments of the invention.

Generating Driver Location Data

As described above, driver location devices determine the location of a driver. In many embodiments, driver location devices obtain driver data (such as, but not limited to, the name of the driver and/or a unique driver identifier) and use that information to identify the driver. For example, a driver location device can include a software application that the driver must sign into before the driver location device will begin recording the driver's location. Additionally, the driver location device can associate with a vehicle location device in the vehicle. In several embodiments, this association is used to determine which driver is driving the vehicle at any given time, particularly in those embodiments where multiple drivers are located in the same vehicle. In a number of embodiments, the pairing of vehicle location devices and driver location devices includes synchronizing the devices, such as by setting a common starting location, starting time, and/or sampling rates. Driver location devices can determine the location of a driver utilizing any of a variety of techniques, including those described above and those described in U.S. Pat. No. 8,489,271 and U.S. Patent Publication Nos. 2013/0073142, 2014/0111354, 2014/0142886, 2014/0236518, and 2014/0236519 incorporated by reference above.

Figure 5:
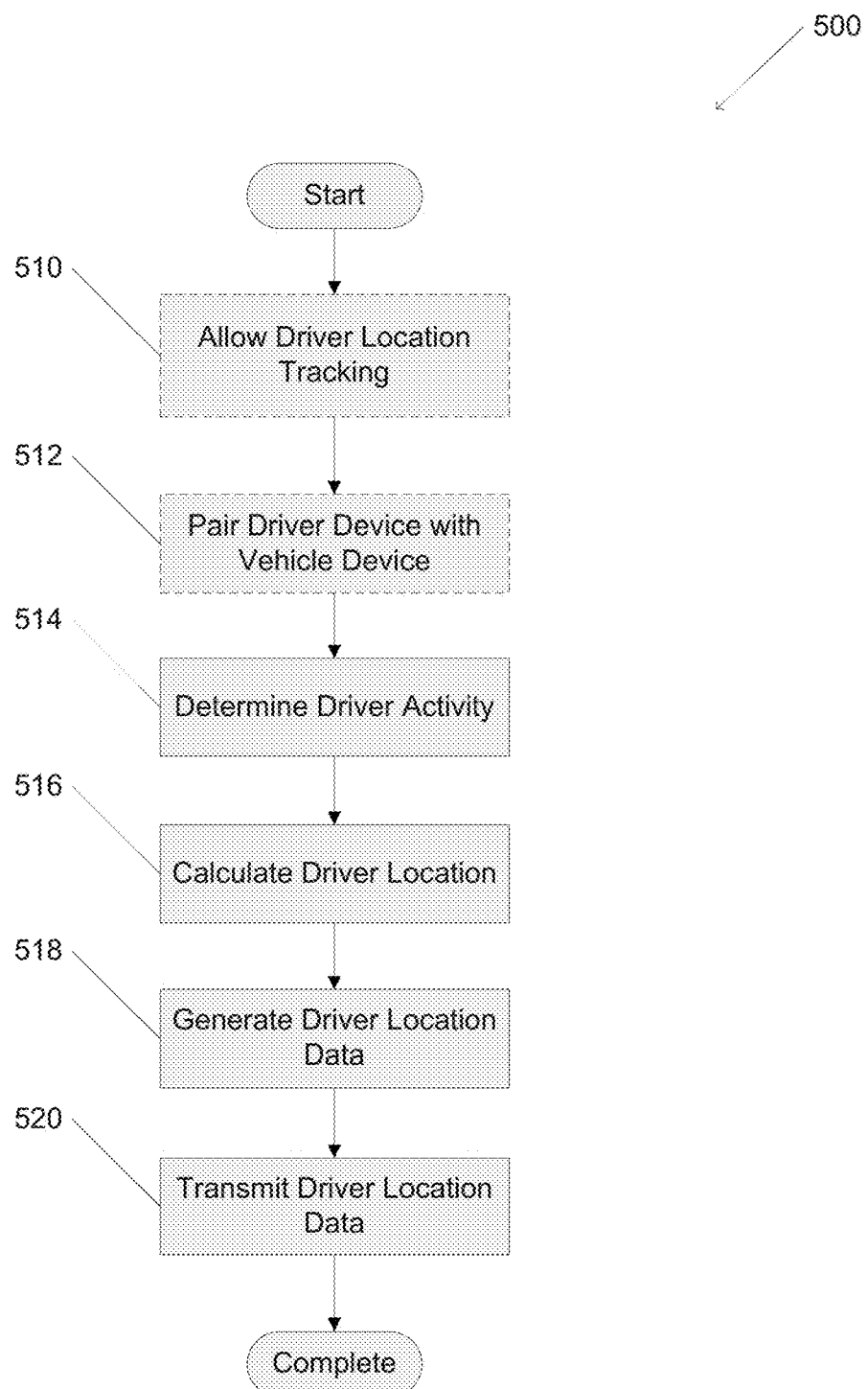
FIG. 5 is a flow chart illustrating a process for generating driver location data in accordance with an embodiment of the invention.

A process for generating driver location data in accordance with an embodiment of the invention is illustrated in FIG. 5. In a number of embodiments, the process 500 includes allowing (510) driver location tracking and/or pairing (512) a driver location device with a vehicle location device. The process 500 also includes determining (514) driver activity, calculating (516) driver location, generating (518) driver location data, and transmitting (520) driver location data.

Specific processes for generating driver location data in accordance with embodiments of the invention are described above with respect to FIG. 5; however, any number of processes, including those that store driver location data on a driver location device and transmit the data once the driver location device is connected to a network or a location tracking server system, can be utilized as appropriate to the requirements of a specific application in accordance with embodiments of the invention.

Correlating Vehicle and Driver Data

As described above, generating driver vehicle data includes correlating vehicle location data and driver location data. In many embodiments, a variety of metadata is used to supplement the location data provided in order to differentiate between vehicles within close proximity to each other. For example, vehicles may be stored in a parking garage having multiple levels and vehicles may be driven on surface and underground streets along with multi-level bridges. Furthermore, different GPS devices (particularly those from different manufacturers) may exhibit varying degrees of accuracy with respect to the determined location and may have differing drift characteristics. Additionally, a variety of driving behaviors can be determined based on the vehicle location data and the driver location data and utilized to generate vehicle driver data as appropriate to the specific applications in accordance with embodiments of the invention. In particular, techniques disclosed in the disclosures of U.S. Pat. No. 8,489,271 and U.S. Patent Publication Nos. 2013/0073142, 2014/0111354, 2014/0142886, 2014/0236518, and 2014/0236519, incorporated by reference in their entirety above, can be utilized in many embodiments of the invention.

In several embodiments, driver location data and/or vehicle location data include metadata describing a change in direction of travel, hard acceleration (or declaration), and/or lateral acceleration, or any other metadata describing driving behavior as appropriate to the requirements of specific applications of the invention. In a variety of embodiments, a change in direction of travel is indicated by measuring the change in heading as described by multiple pieces of driver location data and/or vehicle location data. Any change in heading, such as greater than or equal to 30 degrees, can indicate a change in direction as appropriate to the requirements of specific applications of the invention. In many embodiments, this metadata is sent in addition to driver location data and/or vehicle location data sent out on a regular schedule utilizing techniques similar to those described above.

This metadata can be utilized to correlate the driver location data and the vehicle location data. In a number of embodiments, the correlation includes compensating for differences in time and/or location. In several embodiments, the driver location data and/or vehicle location data can be searched in order to identify corresponding driving events. Any search can be utilized, including geo-location searches, as appropriate to the requirements of specific applications of embodiments of the invention. The geo-location search can be fine-tuned (or the results of the search filtered by) a variety of metadata associated with the vehicle location data and/or driver location data. This metadata includes, but is not limited to, altitude data, heading data, account data, driver data, vehicle data, and/or any other metadata that can be used to narrow the correlation of vehicle location data and driver location data as appropriate to the requirements of specific applications of the invention.

In the event that the above correlation and search results in multiple vehicles and/or multiple drivers so that a pairing cannot be determined, historical vehicle location data and/or driver location data (such as data starting from the beginning of the trip) can be utilized to augment the data analysis. In this way, the entire trip can be analyzed to resolve potential ambiguities in particular portions of the travel routes. In a variety of embodiments, this analysis includes fitting a curve to the location data and selecting the vehicle location curve and the driver location curve that are the most similar as measured by any of a variety of techniques, such as a confidence score and/or a similarity score, as appropriate to the requirements of specific applications of embodiments of the invention. However, if the historical data is insufficient to resolve the issues, additional driver location data and/or vehicle location data can be obtained in order to provide more data points for the analysis.

Figure 6:
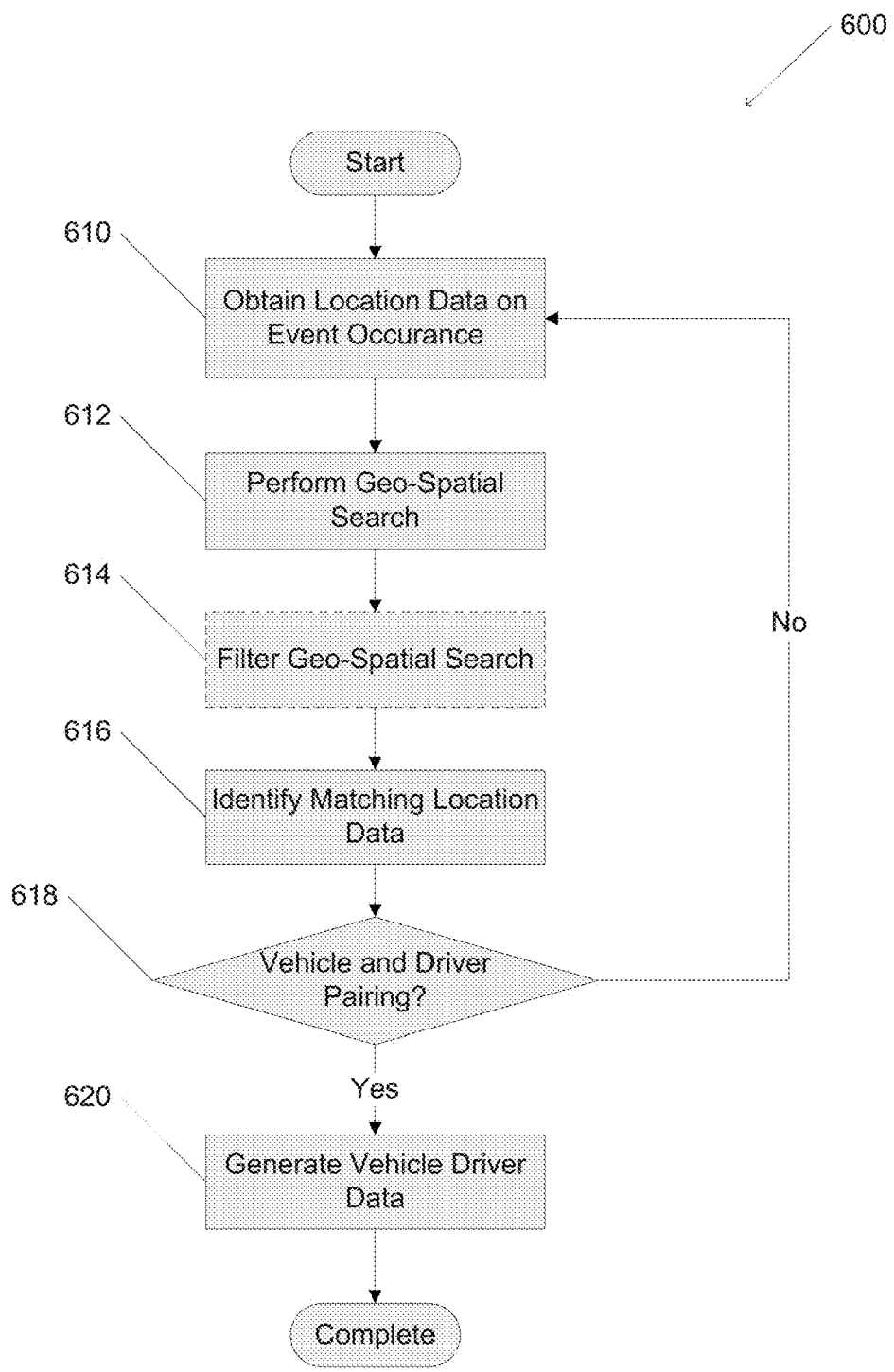
FIG. 6 is a flow chart illustrating a process for correlating driver location data and vehicle location data in accordance with an embodiment of the invention.

A process for correlating vehicle and driver data in accordance with an embodiment of the invention is illustrated in FIG. 6. The process 600 includes obtaining (610) location data related to an event occurrence. A geo-spatial search is performed (612) and, in a number of embodiments, the search results are filtered (614). Matching location data is identified (616) and, if a vehicle and driver pairing is identified (618), vehicle driver data is generated. If a vehicle and driver pairing is not identified (618), additional data is obtained (610). Specific processes for generating vehicle driver data in accordance with embodiments of the invention are described above with respect to FIG. 6; however, any number of processes, including those that identify event occurrences utilizing techniques other than those described above, can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A location tracking system, comprising:
a processor; and
a memory storing a location tracking application;
wherein the location tracking application directs the processor to:
   pair a vehicle location device and a driver location device, wherein the pair occurs by associating a driver identifier and a timestamp with the driver location device and the vehicle location device, wherein the pair is not based on comparing vehicle location data and driver location data;
   obtain vehicle location data by using the vehicle location device, wherein the vehicle location data comprises a set of vehicle location data points;
   obtain driver location data by using the driver location device, wherein the driver location data comprises a set of driver location data points;
   correlate the vehicle location data and the driver location data to generate correlated data;
   generate vehicle driver data based on the correlated data, wherein the vehicle driver data includes a set of drivers associated with a vehicle; and
   identify a driver that drove the vehicle at a particular time by using the vehicle driver data and the timestamp.

2. The location tracking system of claim 1, wherein:
the location tracking system further comprises a network interface; and
the location tracking application directs the processor to obtain the vehicle location data by using the network interface.

3. The location tracking system of claim 1, wherein
the location tracking application directs the processor to correlate the vehicle location data and the driver location data based on overlapping location data points in the set of vehicle location data points and driver location data points.

4. The location tracking system of claim 3, wherein:
the vehicle location data further comprises a vehicle location sampling rate;
the driver location data further comprises a driver location sampling rate; and
the correlation of the overlapping location data points is based on the vehicle location sampling rate and the driver location sampling rate.

5. The location tracking system of claim 4, wherein
the driver location sampling rate is greater than the vehicle location sampling rate.

6. The location tracking system of claim 5, wherein
the driver location sampling rate is greater than or equal to double the vehicle location sampling rate.

7. The location tracking system of claim 1, wherein:
the driver location data further comprises driver identification data uniquely identifying the driver; and
the vehicle driver data further comprises the driver identification data.

8. The location tracking system of claim 1, wherein
the location tracking application directs the processor to correlate the vehicle location and the driver location data by:
   calculating vehicle route data based on the vehicle location data, wherein the vehicle route data comprises a path describing the route taken by the vehicle;
   calculating driver route data based on the driver location data, wherein the driver route data comprises a path describing the route taken by the driver;
   computing a similarity score based on the vehicle route data and the driver route data; and
   when the similarity score exceeds a threshold value, determine that the vehicle location data and the driver location data are correlated.

9. The location tracking system of claim 1, wherein the location tracking application further directs the processor to synchronize the vehicle location device and the driver location device by setting a common starting location.

10. The location tracking system of claim 1, wherein the location tracking application further directs the processor to synchronize the vehicle location device and the driver location device by setting a common sampling rate.

11. A method for associating drivers with vehicles, comprising:
   pairing a vehicle location device and a driver location device, wherein the pairing includes associating a driver identifier and a timestamp with the driver location device and the vehicle location device, wherein the pairing is not based on comparing vehicle location data and driver location data;
   obtaining vehicle location data by using a location tracking system, wherein the vehicle location data comprises a set of vehicle location data points;
   obtaining driver location data by using the location tracking system, wherein the driver location data comprises a set of driver location data points;
   correlating the vehicle location data and the driver location data by using the location tracking system; and
   generating vehicle driver data based on the correlated vehicle location data and driver location data by using the location tracking system, wherein the generated vehicle driver data comprises a set of drivers associated with a vehicle.

12. The method of claim 11, wherein:
the location tracking system comprises a network interface; and
the method includes obtaining the vehicle location data by using the network interface.

13. The method of claim 11, further comprising
correlating the vehicle location data and the driver location data based on overlapping location data points in the set of vehicle location data points and driver location data points by using the location tracking system.

14. The method of claim 13, wherein:
the vehicle location data further comprises a vehicle location sampling rate;
the driver location data further comprises a driver location sampling rate; and
correlating the overlapping location data points is based on the vehicle location sampling rate and the driver location sampling rate.

15. The method of claim 14, wherein
the driver location sampling rate is greater than the vehicle location sampling rate.

16. The method of claim 15, wherein
the driver location sampling rate is greater than or equal to double the vehicle location sampling rate.

17. The method of claim 11, wherein:
the driver location data further comprises driver identification data uniquely identifying the driver; and
the vehicle driver data further comprises the driver identification data.

18. The method of claim 11, further comprising
correlating the vehicle location and the driver location data by:
calculating vehicle route data based on the vehicle location data by using the location tracking system, wherein the vehicle route data comprises a path describing the route taken by the vehicle;
 calculating driver route data based on the driver location data by using the location tracking system, wherein the driver route data comprises a path describing the route taken by the driver;
 computing a similarity score based on the vehicle route data and the driver route data by using the location tracking system; and
 when the similarity score exceeds a threshold value, determining that the vehicle location data and the driver location data are correlated by using the location tracking system.

19. The method of claim 11, further comprising
synchronizing the vehicle location device and the driver location device by setting a common starting location by using the location tracking system.

20. The method of claim 11, further comprising
synchronizing the vehicle location device and the driver location device by setting a common sampling rate by using the location tracking system.

* * * * *